(12) United States Patent
Li et al.

(10) Patent No.: US 9,153,798 B2
(45) Date of Patent: Oct. 6, 2015

(54) EXPLOSION-PROOF SECONDARY BATTERY

(71) Applicant: SHENZHEN HIGHPOWER TECHNOLOGY CO., LTD, Shenzhen, Guangdong (CN)

(72) Inventors: Wenliang Li, Shenzhen (CN); Zhixiong Zhou, Shenzhen (CN); Yuanxian Liu, Shenzhen (CN); Lingkun Kong, Shenzhen (CN)

(73) Assignee: SHENZHEN HIGHPOWER TECHNOLOGY CO., LTD., Shenzhen (CN)

( * ) Notice: Subject to any disclaimer, the term of this patent is extended or adjusted under 35 U.S.C. 154(b) by 115 days.

(21) Appl. No.: 13/673,634

(22) Filed: Nov. 9, 2012

(65) Prior Publication Data

US 2013/0122357 A1    May 16, 2013

(30) Foreign Application Priority Data

Nov. 11, 2011   (WO) ................ PCT/CN2011/082083

(51) Int. Cl.
*H01M 2/02*   (2006.01)
*H01M 2/08*   (2006.01)
*H01M 2/04*   (2006.01)

(52) U.S. Cl.
CPC .............. *H01M 2/02* (2013.01); *H01M 2/0413* (2013.01); *H01M 2/08* (2013.01)

(58) Field of Classification Search
None
See application file for complete search history.

(56) References Cited

U.S. PATENT DOCUMENTS

2010/0021812 A1*   1/2010   Kim et al. ..................... 429/185

FOREIGN PATENT DOCUMENTS

JP   2006-092864   *   4/2006

* cited by examiner

*Primary Examiner* — Patrick Ryan
*Assistant Examiner* — Christopher Domone
(74) *Attorney, Agent, or Firm* — Birch, Stewart, Kolasch & Birch, LLP

(57) ABSTRACT

An explosion-proof secondary battery includes a shell, an anode cap, a sealing ring, and a separating structure. The shell defines an opening on the top, and the shell comprises a crimping portion extending from the opening; the anode cap is disposed in the opening and latched with the crimping portion; the sealing ring is configured to seal a gap between the anode cap and the crimping portion; and a separating structure is disposed in the gap, and the separating structure resists the sealing ring; wherein the gap is remained when the sealing ring is melted, the anode cap is fixed to the shell by the crimping portion. In the explosion-proof secondary battery, due to the separating structure resisting the sealing ring, there is a gap between the anode cap and the periphery of the crimping portion of the shell, the internal gas of the explosion-proof secondary battery may successfully exhaust from the gap. Therefore, the internal air pressure of the explosion-proof secondary battery is decreased, and the separating structure prevents the explosion-proof secondary from exploding.

20 Claims, 6 Drawing Sheets

EXPLOSION-PROOF SECONDARY BATTERY

FIELD INVENTION

The present disclosure relates to secondary batteries, more particularly relates to an explosion-proof secondary battery.

BACKGROUND OF THE INVENTION

A secondary battery is a battery that can be charged and discharged several times or more. The breakage of a traditional secondary battery often occurs due to internal short circuit, collision, baking in fire and so on. In particular, if the situation continues for a certain period of time, the temperature of the secondary battery rises significantly. Therefore, a sealing ring melts at high temperature, and the internal pressure of the traditional secondary battery is increased, meanwhile the anode cap of the traditional secondary battery bulges outward, the melted sealing ring seals off the traditional secondary battery absolutely, so the inside gas of the traditional secondary battery could not exhaust, and the traditional secondary battery may explode.

Therefore, there is room for improvement within the art.

SUMMARY OF THE INVENTION

In one aspect of the present disclosure, an explosion-proof secondary battery is desired.

An explosion-proof secondary battery includes a shell, a cell, an anode cap, a sealing ring, and a separating structure. The shell defines an opening on the top. The shell includes a crimping portion, and the crimping portion extends from the edge of the opening. The cell is disposed in the shell. The anode cap is disposed in the opening of the shell. The sealing ring sleeves on the periphery of the anode cap. The separating structure connects to the sealing ring. Wherein the crimping portion covers the sealing ring and fixes the anode cap to the shell.

In an embodiment, wherein the separating structure is a gasket, the gasket may resist between the sealing ring and the crimping portion, or the gasket may resist between the sealing ring and the anode cap, or the gasket may insert into the sealing ring.

In an embodiment, wherein the gasket may be made of metal.

In an embodiment, wherein the thickness of the gasket is in a range of 0.01~5 mm.

In an embodiment, wherein the separating structure is a protrusion, the protrusion is formed by defining a sunken-point on an outer surface of the crimping portion.

In an embodiment, wherein the depth of the sunken-point is in a range of 0.01 mm~5 mm.

In an embodiment, wherein the number of the sunken-point is in a range of 1~50.

In an embodiment, wherein the separating structure is protrusion, the protrusion is formed by defining a convex-point fixed on an outer surface of the anode cap, the sealing ring covers partial portion of the convex-point.

In an embodiment, wherein the height of the convex-point is in a range of 0.01 mm~5 mm.

In an embodiment, wherein the number of the convex-point is in a range of 1~50.

An explosion-proof secondary battery includes a shell, an anode cap, a sealing ring, a separating structure. The shell defines an opening on the top, and the shell comprises a crimping portion, the crimping portion extends from the opening. The anode cap is disposed in the opening and latches with the crimping portion. The sealing ring is configured to seal a gap between the anode cap and the crimping portion, and a separating structure is disposed in the gap, and the separating structure resists the sealing ring. Wherein the gap is remained when the sealing ring melts, the anode cap is fixed to the shell by the crimping portion.

In an embodiment, wherein the separating structure is a gasket, the gasket may resist between the sealing ring and the crimping portion, or the gasket may resist between the sealing ring and the anode cap, or the gasket may insert into the sealing ring.

In an embodiment, wherein the gasket may be made of metal.

In an embodiment, wherein the thickness of the gasket is in a range of 0.01~5 mm.

In an embodiment, wherein the separating structure is a protrusion, the protrusion is formed by defining a sunken-point on an outer surface of the crimping portion.

In an embodiment, wherein the depth of the sunken-point is in a range of 0.01 mm~5 mm.

In an embodiment, wherein the number of the sunken-point is in a range of 1~50.

In an embodiment, wherein the separating structure is protrusion, the protrusion is formed by defining a convex-point fixed on an outer surface of the anode cap, the sealing ring covers partial portion of the convex-point.

In an embodiment, wherein the height of the convex-point is in a range of 0.01 mm~5 mm.

In an embodiment, wherein the number of the convex-point is in a range of 1~50.

When the sealing ring melts at high temperature, the separating structure may not be melted. Due to the separating structure of the explosion-proof secondary battery resisting the sealing ring, there is a gap remained between the anode cap and the periphery of the crimping portion of the shell. Therefore, the gas in the explosion-proof secondary battery may successfully exhaust from the gap, then the inner air pressure of the explosion-proof secondary battery is decreased, and the separating structure prevents the explosion-proof secondary battery from exploding.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Combining drawings with the embodiments to describe the explosion-proof secondary battery in details.

Figure 1:
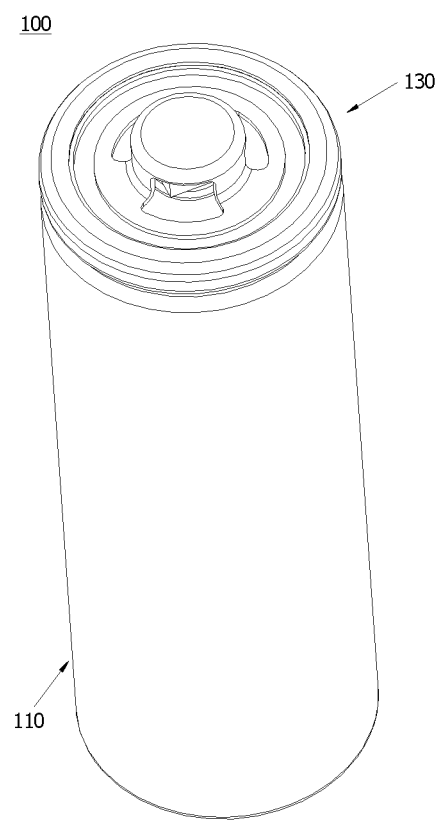
FIG. 1 is a schematic view of a first embodiment of an explosion-proof secondary battery.
Figure 2:
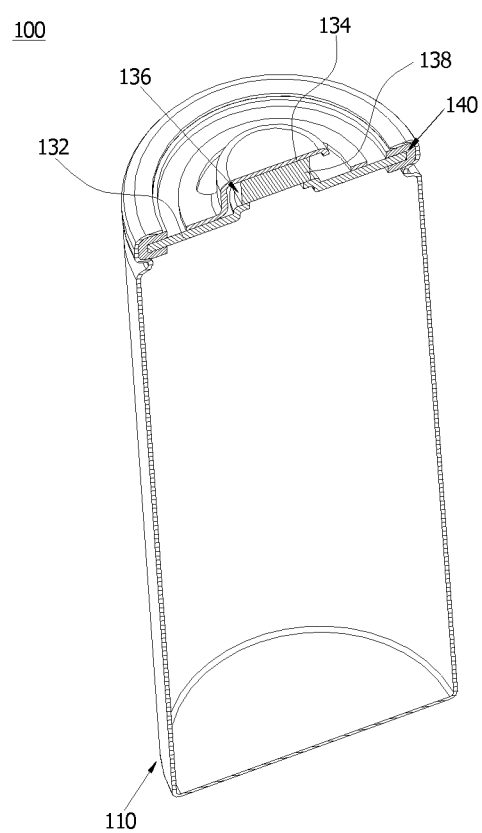
FIG. 2 is a sectional view of the explosion-proof secondary battery of FIG. 1.
Figure 3:
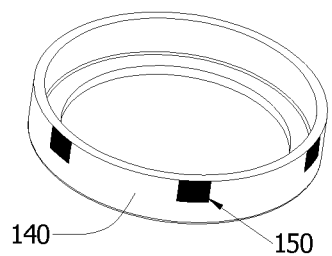
FIG. 3 is a schematic view of a sealing ring of the explosion-proof secondary battery of FIG. 1.

Referring to FIGS. 1 and 2, a first embodiment of an explosion-proof secondary battery 100 includes a shell 110, a cell (not shown) disposed in the shell 110, an anode cap 130, a sealing ring 140, and a separating structure 150 (referring to FIG. 3).

In an embodiment, the shell 110 is substantially cylindrical. The shell 110 defines an opening (not labeled) on the top of the shell 110, and the shell 110 includes a crimping portion (not labeled). The crimping portion 112 extends from an edge of the opening and bends inward.

The sealing ring 140 is disposed in the opening of the shell 110. The sealing ring 140 sleeves on the periphery of the anode cap 130.

Referring to FIG. 3, the separating structure 150 may resist the sealing ring 140.

In a first embodiment, the separating structure 150 of the explosion-proof secondary battery 100 may resist the sealing ring 140. When the internal temperature of the explosion-proof secondary battery 100 is so high that the sealing ring 140 melts. Due to the separating structure 150 resisting the sealing ring 140, there is a gap between the anode cap 130 and the periphery of the crimping portion of the shell 110. Therefore, the inside gas of the explosion-proof secondary battery 100 may successfully exhaust from the gap, then the inner air pressure is decreased, the separating structure 150 prevents the explosion-proof secondary battery 100 from exploding.

The anode cap 130 includes a bottom cover 132 and a top cover 134. The shape of the bottom cover 132 engages with the shape of the shell 110. The top cover 134 is fixed on the bottom cover 132. The bottom cover 132 and the top cover 134 corporately define a receiving cavity 136 to receive the explosion-proof ball 138.

The sealing ring 140 sleeves on the periphery of the bottom cover 132.

Referring to FIG. 3, in an embodiment, the separating structure 150 is a gasket, the gasket may insert into the sealing ring 140. When the sealing ring 140 melts, the gasket may not be melted, and there is a gap between the crimping portion 112 and the edge of the shell 110. The gas may be released outside from the gap.

In another embodiment, the gasket resists between the sealing ring 140 and the crimping portion 112. When the sealing ring 140 melts, the gasket may not be melted, and there is a gap between the bottom cover 132 and the crimping portion 112. The gas may be released outside from the gap.

In another embodiment, the gasket resists between the sealing ring 140 and the bottom cover 132. When the sealing ring 140 melts, the gasket may not be melted, and there is a gap between the bottom cover 132 and the edge of the shell 110. The gas may be released outside from the gap.

The gasket may be made of metal. The thickness of the gasket is in a range of 0.01~5 mm. The gasket may be substantially straight line shaped, cross-shaped, rectangular, foursquare, trapezoidal, spotted, triangular or any polygonal. However, the gasket is not limited to the listed above shapes. The number of the gaskets is in a range of 1~50.

Figure 4:
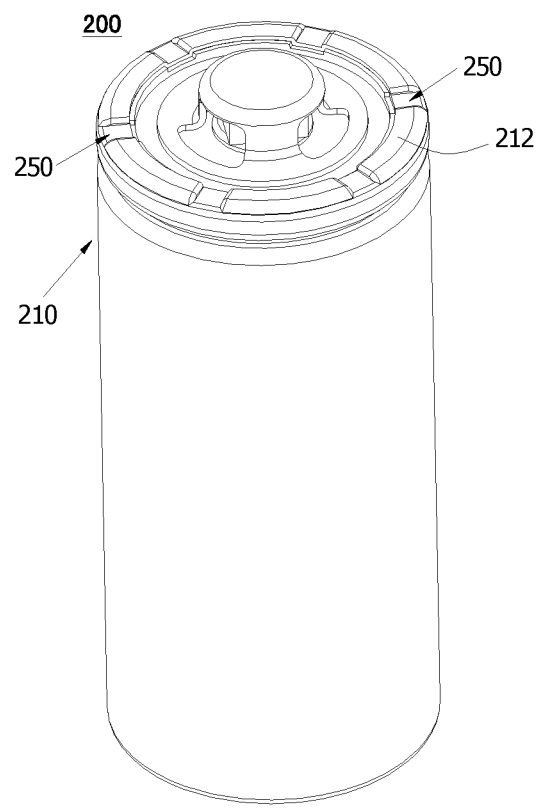
FIG. 4 is a schematic view of a second embodiment of an explosion-proof secondary battery.
Figure 5:
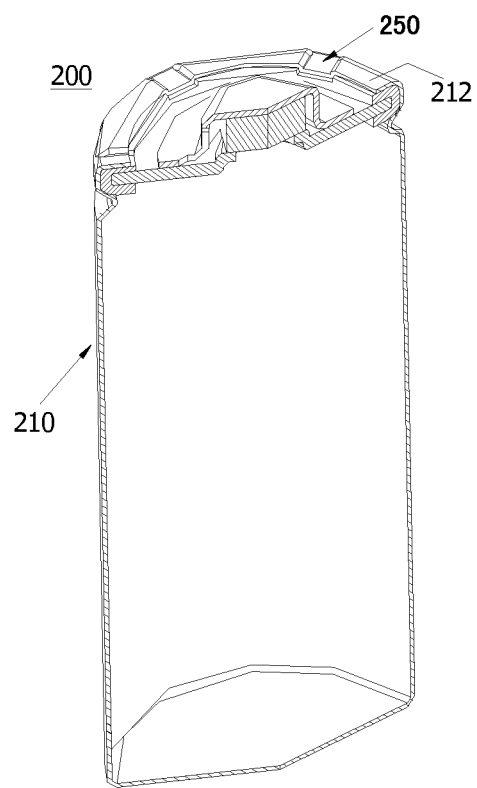
FIG. 5 is a sectional view of the explosion-proof secondary battery of FIG. 4.

Referring to FIGS. 4 and 5, in a second embodiment, the explosion-proof secondary battery 200 is similar to the explosion-proof secondary battery 100 on the configuration, but there is a difference. The difference is that the separating structure 250 is a protrusion. The protrusion may be formed by defining a sunken-point on an outer surface of the crimping portion 212.

The sunken-point may be shaped, and then the explosion-proof secondary battery 200 is sealed. In another embodiment, the sunken-point may be shaped at the same time when the explosion-proof secondary battery 200 is sealed. The depth of the sunken-point is in a range of 0.01 mm~5 mm. The sunken-point substantially straight line shaped, cross-shaped, rectangular, foursquare, trapezoidal, spotted, triangular or any polygonal or a curved surface sunken-point. However, the sunken-point is not limited to the listed above shapes. The number of the sunken-point is in a range of 1~50.

Figure 6:
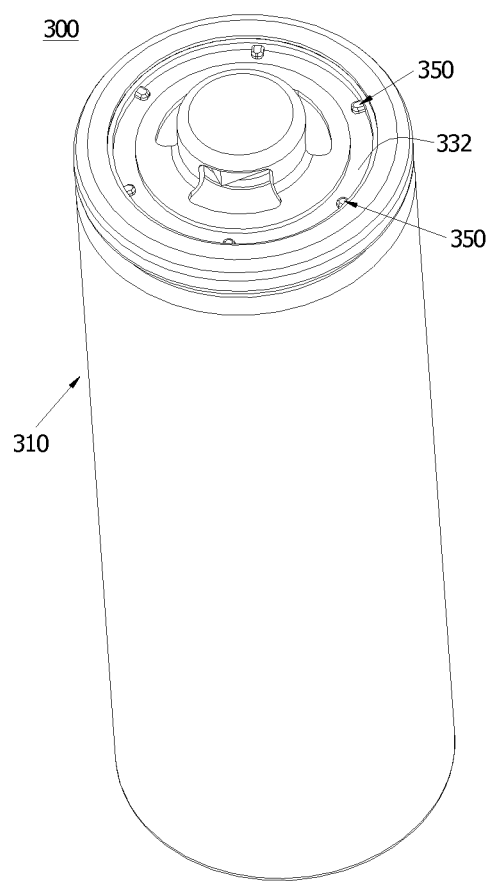
FIG. 6 is a schematic view of a third embodiment of an explosion-proof secondary battery.
Figure 7:
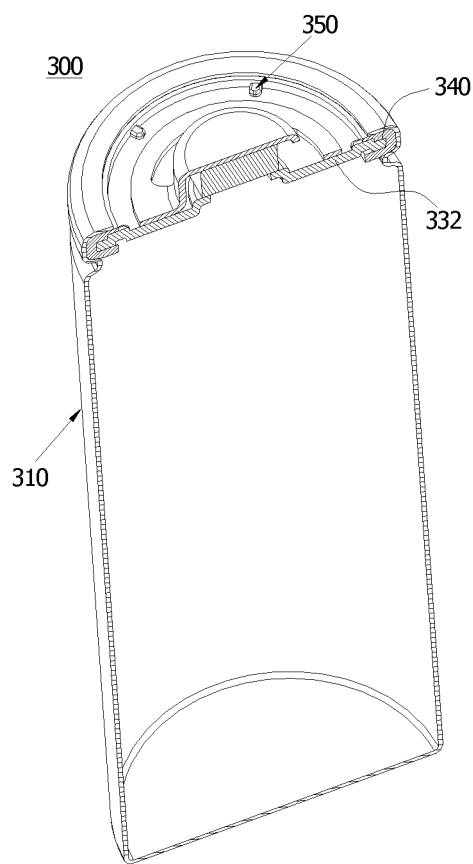
FIG. 7 is a sectional view of the explosion-proof secondary battery of FIG. 6.

Referring to FIGS. 6 and 7, in a third embodiment, the explosion-proof secondary battery 300 is similar to the explosion-proof secondary battery 100 on the configuration, but there is a difference. The difference is that the separating structure 350 is a protrusion defining a convex-point. The convex-point is disposed on a periphery of the bottom cover 322 away from the cell. The sealing ring 340 covers a partial portion of the separating structure 350.

The convex-point may be shaped, and then the explosion-proof secondary battery 300 is sealed. In another embodiment, the convex-point may be shaped at the same time when the explosion-proof secondary battery 300 is sealed. The height of the convex-point is in a range of 0.01 mm~5 mm. The convex-point may be substantially straight line shaped, cross-shaped, rectangular, foursquare, trapezoidal, spotted, triangular or any polygonal or curved surface protrusion. However, the convex-point is not limited to the listed above shapes. The number of the protrusions is in a range of 1~50.

In another embodiment, the explosion-proof secondary battery is substantially similar to the explosion-proof secondary battery 100 on the configuration. The explosion-proof secondary battery has at least two of the gasket, the sunken-point, and the convex-point.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. An explosion-proof secondary battery comprising:
 a shell having an opening containing an annular crimped portion which defines said opening;
 a cell disposed in the shell;
 an anode cap provided to close the opening;
 a sealing ring disposed in the annular crimped portion for engagement and sealing with the periphery of the anode cap, said explosion-proof secondary battery further comprising a separating structure that comprises either a gasket or a protrusion, which resists the sealing of the shell with the anode cap;
 wherein the crimped portion covers the sealing ring and fixes the anode cap to the shell, whereby, when the sealing ring is disintegrated, a gap is generated between the crimped portion and the anode cap to enable gas to be exhausted from the gap which decreases the inner air pressure of the explosion-proof secondary battery to prevent an explosion.

2. The explosion-proof secondary battery according to claim 1, wherein the separating structure is a gasket, said gasket providing resistance between the sealing ring and the crimped portion, or between the sealing ring and the anode cap, or the gasket inserted into the sealing ring.

3. The explosion-proof secondary battery according to claim 2, wherein the gasket is made of a metal.

4. The explosion-proof secondary battery according to claim 2, wherein the thickness of the gasket is 0.01~5 mm.

5. The explosion-proof secondary battery according to claim 1, wherein the separating structure is a protrusion, and the protrusion is defined by a sunken-point disposed on an outer surface of the crimped portion.

6. The explosion-proof secondary battery according to claim 5, wherein the depth of the sunken-point is 0.01 mm~5 mm.

7. The explosion-proof secondary battery according to claim 5, wherein the number of sunken-points is 1~50.

8. The explosion-proof secondary battery according to claim 1, wherein the separating structure is a protrusion, and the protrusion defines a convex-point fixed on an outer surface of the anode cap, and the crimped portion partially covers a portion of the convex-point.

9. The explosion-proof secondary battery according to claim 8, wherein the height of the protrusion is 0.01 mm~5 mm.

10. The explosion-proof secondary battery according to claim 8, wherein the number of the protrusions is 1~50.

11. An explosion-proof secondary battery, comprising:
a shell having an opening containing an annular crimped portion which defines said opening;
an anode cap provided to close the opening and engage with the crimped portion;
a sealing ring configured to seal a gap between the anode cap and the crimped portion; and
a separating structure comprising a gasket or protrusion disposed in the gap and configured to resist the sealing of the shell with the anode cap;
wherein the gap is retained by the separating structure when the sealing ring disintegrates, and wherein the anode cap is fixed to the crimped portion by the separating structure.

12. The explosion-proof secondary battery according to claim 11, wherein the separating structure is a gasket, said gasket providing resistance between the sealing ring and the crimped portion, or between the sealing ring and the anode cap, or wherein the gasket is inserted into the sealing ring.

13. The explosion-proof secondary battery according to claim 12, wherein the gasket is made of a metal.

14. The explosion-proof secondary battery according to claim 12, wherein the thickness of the gasket is 0.01~5 mm.

15. The explosion-proof secondary battery according to claim 11, wherein the separating structure is a protrusion, and the protrusion is defined by a sunken-point disposed on an outer surface of the crimped portion.

16. The explosion-proof secondary battery according to claim 15, wherein the depth of the sunken-point is 0.01 mm~5 mm.

17. The explosion-proof secondary battery according to claim 15, wherein the number of the sunken-points is 1~50.

18. The explosion-proof secondary battery according to claim 11, wherein the separating structure is a protrusion defining a convex-point fixed on an outer surface of the anode cap, and the crimped portion partially covers a portion of the convex-point.

19. The explosion-proof secondary battery according to claim 18, wherein the height of the convex-point is 0.01 mm~5 mm.

20. The explosion-proof secondary battery according to claim 18, wherein the number of convex-points is 1~50.

* * * * *